United States Patent Office 3,513,896
Patented May 26, 1970

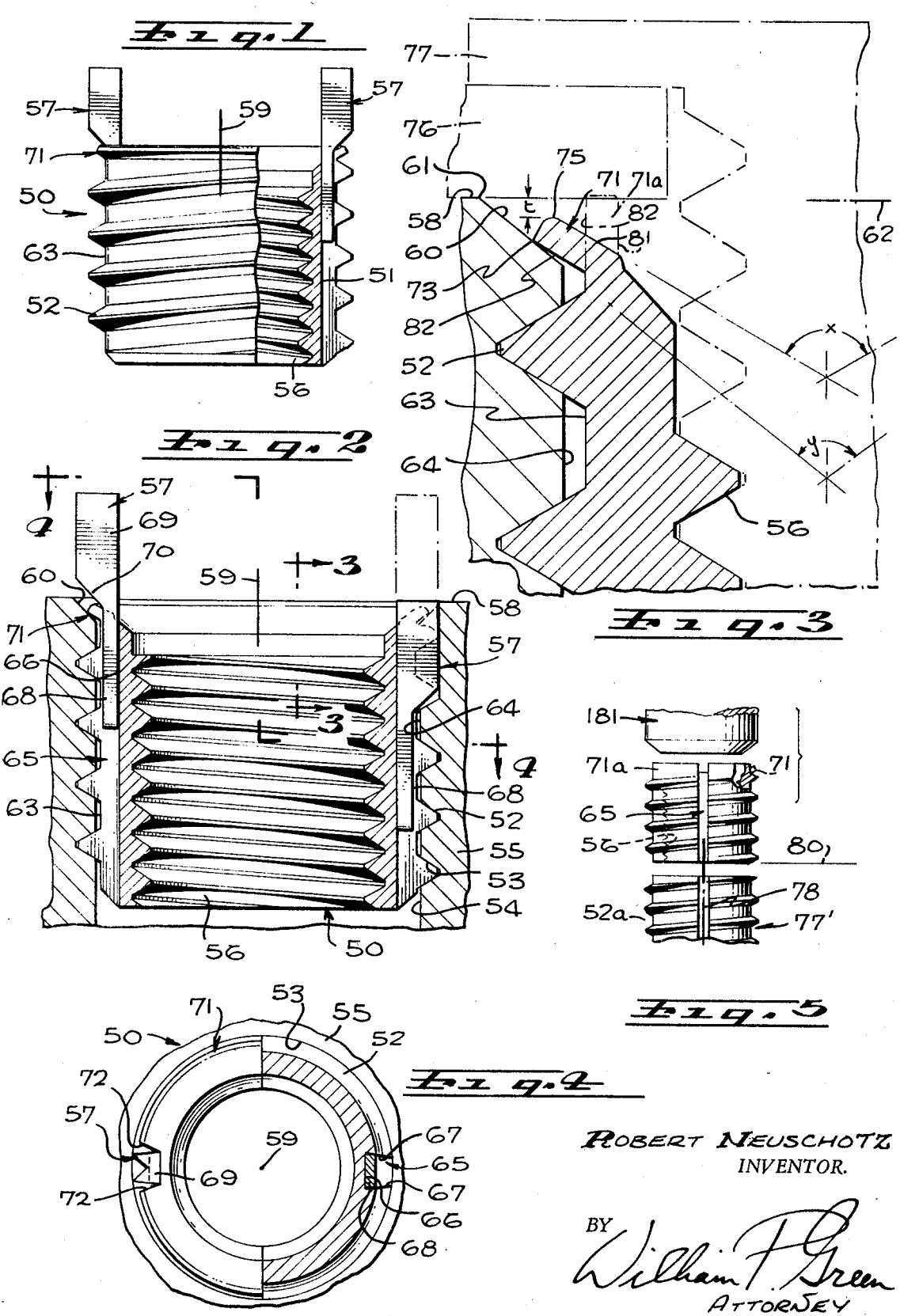

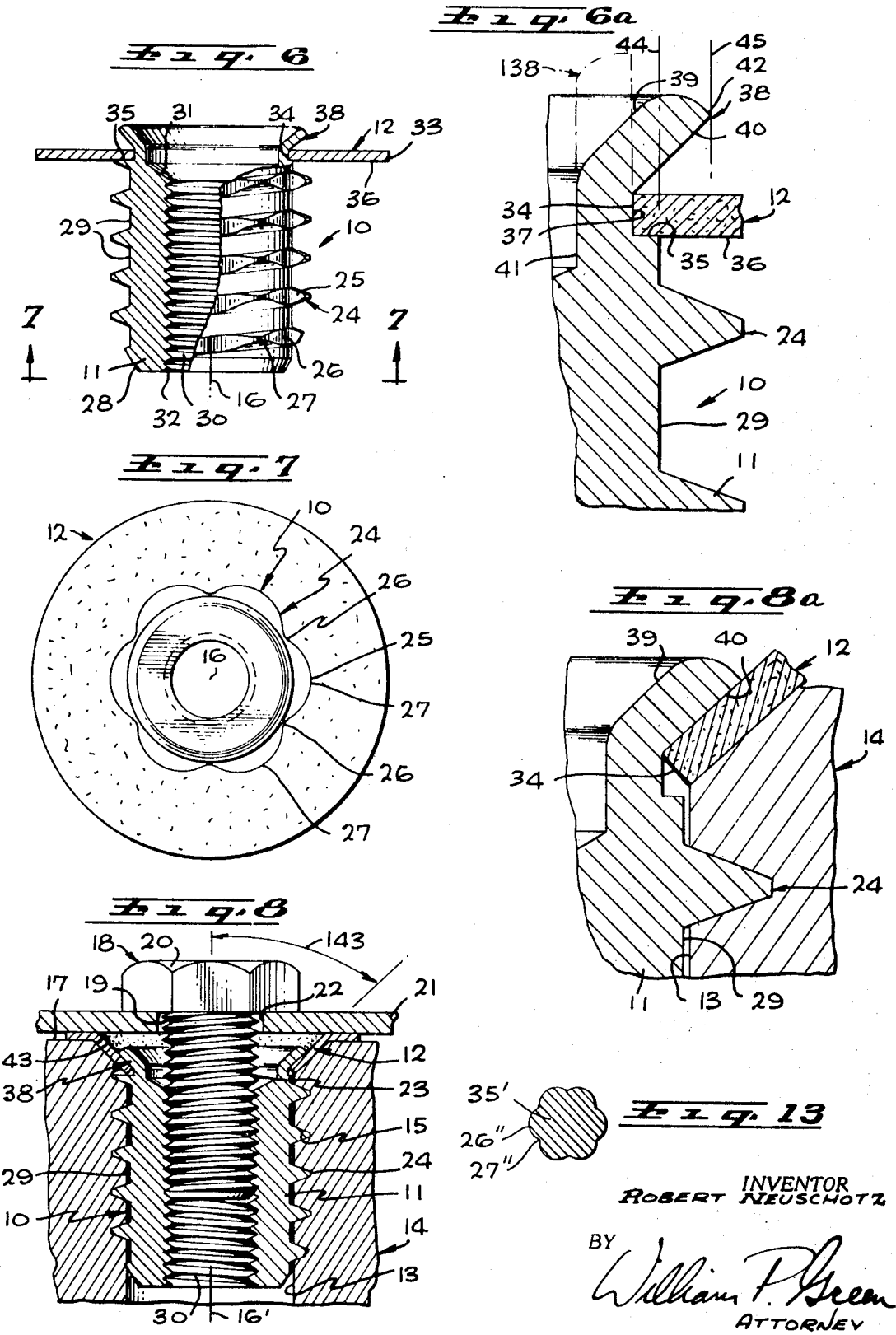

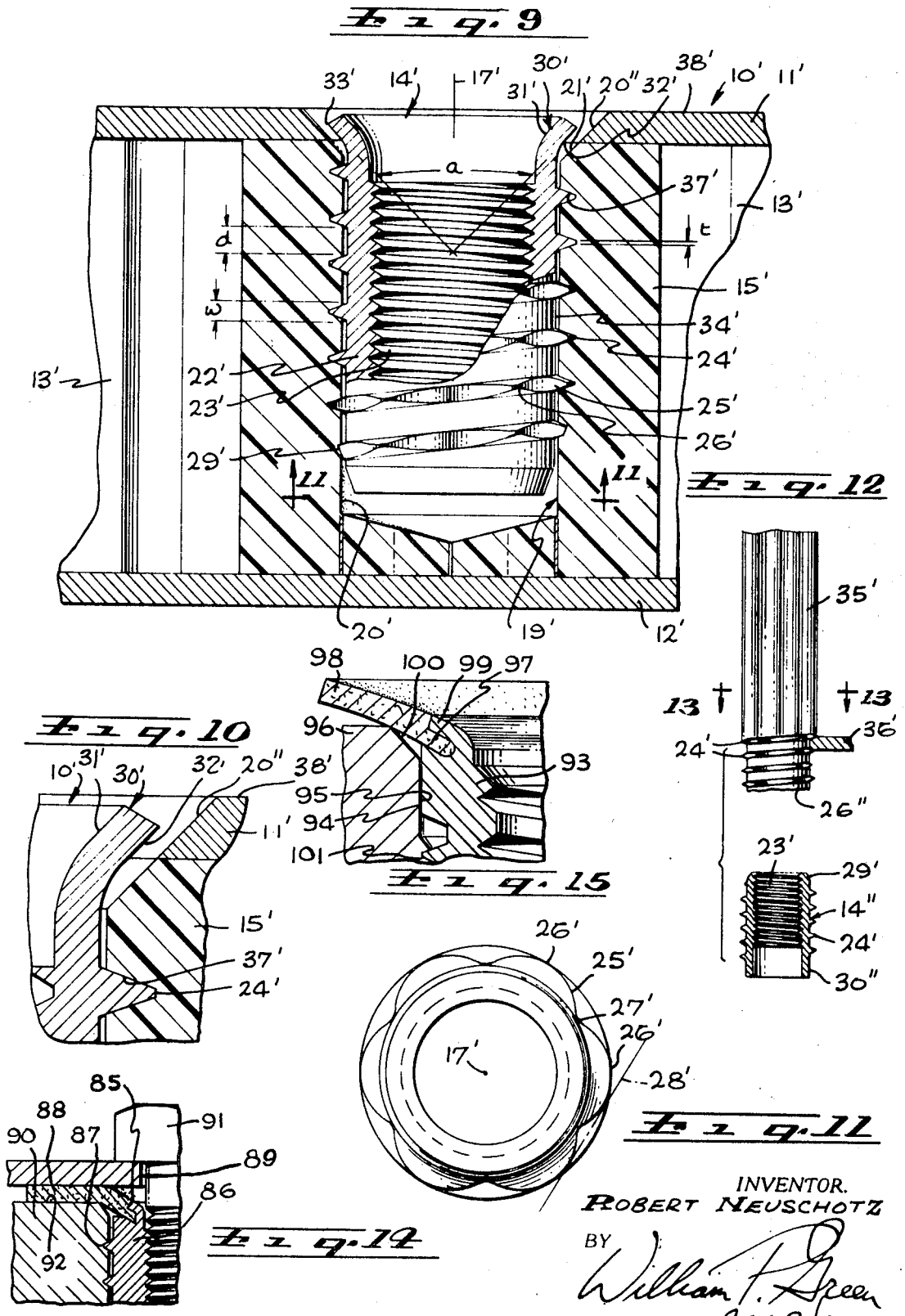

3,513,896
THREADED FASTENERS HAVING FLANGES
Robert Neuschotz, 1162 Angelo Drive,
Beverly Hills, Calif. 90210
Continuation-in-part of application Ser. No. 648,598,
June 26, 1967. This application Aug. 5, 1968, Ser.
No. 750,072
Int. Cl. F16b 39/06
U.S. Cl. 151—23                                    14 Claims

ABSTRACT OF THE DISCLOSURE

A threaded fastener having external threads to be screwed into a carrier part, and having a second set of threads for connection to another member, with the fastener having a laterally projecting flange at the axially outer end of the external threads receivable within and located by a flaring countersink surface formed in the carrier part. The countersink surface may act as a stop for limiting threaded advancement of the fastener into the carrier part, at a position in which the entire flange is for best results located axially inwardly of the plane of an outer surface of the carrier part. The fastener may be made from stock having an outer surface which is initially non-cylindrical and shaped to at least partially define the configuration of the external threads, with the flange preferably being first machined in a generally axially projecting condition, and then deformed radially outwardly to extend radially beyond the minor diameter of the external threads.

CROSS REFERENCES TO RELATED APPLICATIONS

This application is a continuation-in-part of my copending applications Ser. No. 648,598, filed June 26, 1967 on "Structure and Installation Of Threaded Elements Carrying Deformable Spacers," now abandoned; Ser. No. 664,063, filed Aug. 29,1967 on "Honeycomb Structures Containing Threaded Inserts," now U.S. Pat. No. 3,451,-181; and Ser. No. 597,455, filed Nov. 28, 1966 on "Threaded Elements Having Deformable Spacers," now U.S. Pat. No. 3,405,591.

BACKGROUND OF THE INVENTION

This invention relates to threaded fasteners of a type having external threads adapted to be screwed into a passage or recess in a carrier structure, and having a second set of threads to be connected to a coacting member, to secure that member to the carrier structure through the medium of the fastener. The second set of threads may be internal, for engagement with a coacting externally threaded screw, or may be external and formed on an outwardly projecting shank of the fastener. The invention will be described primarily as applied to fasteners of the former type, i.e. to inserts in which the "second" threads are internal.

In using a threaded fastener of the above discussed general type, it is important that the depth of installation of the fastener within the carrier structure be controlled and predetermined very accuately, in order to assure that the connection made to the carrier structure through the fastener will be structurally effective and reliable, and capable of transmitting and withstanding the designed load forces. However, in view of the vey large quantities of inserts and other fasteners which are utilized, in aircraft and other types of structures, the setting of each fastener to the desired optimum depth while highly important, cannot be effected in a manner requiring excessive care or the expenditure of excessive time, by the installing operator. One way of controlling the depth of installation of the insert or fastener within the carrier part is taught in my U.S. Pat. No. 2,855,970 issued Oct. 14, 1958, in which shoulders formed on one or more locking keys carried by the fastener are engageable with the carrier structure to automatically halt installation of the fastener within that structure at the desired depth.

SUMMARY OF THE INVENTION

In a fastener formed in accordance with the present invention, another arrangement for predetermining the depth of setting of the fastener within a carrier structure is provided, specifically by forming on the fastener, at the axially outer end of the external threads, a thin flange which projects laterally or radially outwardly far enough to coact with a countersink surface formed in the carrier structure in a manner positively halting installing advancement of the fastener into a recess in that structure. The flange is desirably dimensioned to be received in its entirety at a location axially inwardly of a predetermined plane of intersection of the flaring countersink surface with an outer surface of the carrier structure, so that the flange, though serving effectively its locating function, will not project axially outwardly far enough to interfere with subsequent connection of another member to the carrier structure through the medium of the fastener. The flange projects radially outwardly beyond the minor diameter of the external threads of the fastener, but for best results not beyond the major diameter of those threads, and optimally not as far radially outwardly as that major diameter.

Certain features of the invention relate to a novel method for forming a fastener of the above discussed general type having a flange as described for halting the installing advancement of the fastener into a carrier structure or for other related purposes. In this method, the flange may initially be formed in a generally axially projecting condition, and then subsequently be deformed radially outwardly to a laterally projecting ultimate condition. A series of such fasteners may be machined progressively from an elongated piece of stock initially having a non-cylindrical outer surface shaped to define at least partially the configuration of the external threads on the fastener, but whose non-cylindrical shape need not appear on the ultimate flange by virtue of the unique method of first forming the flange at a relatively small diameter and then deflecting it outwardly.

BRIEF DESCRIPTION OF THE DRAWINGS

The above and other features and objects of the invention will be better understood from the following detailed description of the typical embodiments illustrated in the accompanying drawings, in which:

FIG. 1 is a partially sectional and partially elevational side view of a first type of threaded insert embodying the invention;

FIG. 2 is an enlarged axial section through the insert of FIG. 1, shown in its installed position within a carrier part;

FIG. 3 is a further enlarged fragmentary section taken on line 3—3 of FIG. 2;

FIG. 4 is a partially plan and partially sectional view taken on line 4—4 of FIG. 2;

FIG. 5 is a somewhat diagrammatic representation of a preferred method of forming the insert from threaded stock;

FIG. 6 is a side elevational view, partially broken away, of a second form of insert constructed in accordance with the invention;

FIG. 6a is a greatly enlarged section through the FIG. 6 device;

FIG. 7 is an end view taken on line 7—7 of FIG. 6;

FIG. 8 shows the insert assembly of FIG. 6 as it appears after installation within a carrier part;

FIG. 8a is an enlarged view similar to FIG. 6a, but showing the device in the FIG. 8 installed condition;

FIG. 9 is a vertical section through a further variational assembly including an insert and a honeycomb structure, with the insert being shown partially in elevation;

FIG. 10 is a greatly enlarged fragmentary representation of a portion of FIG. 9, at the location of the end flange of the insert;

FIG. 11 is a view taken on line 11—11 of FIG. 9, but showing only the insert and not the surrounding honeycomb structure;

FIG. 12 is a somewhat diagrammatic representation of the manner in which a series of the inserts of FIG. 9 are formed from an elongated piece of stock;

FIG. 13 is a transverse section taken on line 13—13 of FIG. 12, and

FIGS. 14 and 15 are fragmentary sections through two additional arrangements.

DESCRIPTION OF THE PREFERRED EMBODIMENTS

Describing the form of the invention shown in FIGS. 1 through 5, and with reference first to FIG. 1, I have illustrated at 50 a threaded insert of a type similar to that disclosed in my prior Pat. No. 2,855,970. This insert includes a generally tubular body 51 desirably formed of an appropriate metal, such as steel, and having external threads 52 adapted to be screwed into mating internal threads 53 (FIG. 2) formed in a passage or recess 54 provided in a carrier part 55. The insert also has a second set of threads 56, typically illustrated as internal threads into which a screw may be connected, to secure the screw to the carrier part 55 through the medium of insert 50. The insert is adapted to be locked in the carrier part by means of a pair of locking keys 57, which are driveable axially from the initial position of the left hand key of FIG. 2 to the position of the right hand key in that figure.

Carrier part 55 may be formed of an appropriate rigid material, such as aluminum or the like, and has an outer planar surface 58, extending about the recess or passage 54, and disposed transversely of axis 59 of the threads 53. At the axially outer end of threaded recess 54, the carrier part 55 has a countersink surface 60, which flares progressively and continuously upwardly, frustoconically, from threads 53 to an annular corner or line 61 at which the flaring or tapering countersink surface intersects and meets the plane 62 of outer surface 58.

External threads 52 on insert 50 may be standard machine threads of conventional 60 degree profile except with respect to their minor diameter regions, at which there are provided modified minor diameter surfaces 63 which have a greater diameter with respect to axis 59, and a greater axial length, than would be the case if threads 52 were completely standard. Similarly, the threads 53 within carrier part 55 are essentially standard except for the provision of modified minor diameter surfaces 64, which have a greater than standard diameter with respect to axis 59, and a greater than standard axial length. Internal threads 56 may be completely standard machine threads, to receive and hold a standard screw.

The two locking keys 57 are frictionally retained in the FIG. 1 positions of partial reception within two diametrically opposite parallel axially extending grooves 65 extending along the outer surface of the insert, and cutting through and interrupting threads 52. These grooves have the undercut or dovetail cross-section illustrated in FIG. 4, each being defined by a planar inner wall surface 66 which extends parallel to axis 59 and faces radially outwardly therefrom, and by two opposed side wall surfaces 67 which converge progressively toward one another as they extend radially outwardly from axis 59. Each key has a radially thin mounting portion 68 which is received within the radially inner portion of the associated groove 65, adjacent the inner wall 66 of the groove, and which is thin enough radially to be received within the minor diameter of carrier part threads 53 (see FIG. 2), so that this portion does not interfere with threaded advancement of the insert into the carrier part. At its axially outer end, each key has a radially thicker portion 69, which projects radially outwardly substantially beyond the minor diameter of threads 52 and 53. At its axially inner or lower end 70, portion 69 of each of the keys has a leading edge which may define a cutting edge adapted to cut through and deform the material of the carrier part when the key is driven axially from the position of the left hand key in FIG. 2 to the position of the right hand key in that figure, to thus lock the insert against removal from the carrier part. The thin portion 68 of the key is so shaped as to be confined closely within dovetail groove 65, and be retained frictionally in fixed position therein, and to be guided by the groove for only axial movement when driven forcibly to locking position by a hammer or the like.

The depth to which body 51 of the insert is screwed into the carrier part is controlled and accurately predetermined by provision on the axially outer end of the insert of an essentially annular stop flange 71, which is engageable in the FIG. 3 position with countersink surface 60. This flange 71 is desirably completely annular except for its interruption at the locations of the two keys 57, and the key receiving grooves 65, as indicated at 72 in FIG. 4. As seen best in FIG. 3, the flange desirably flares upwardly and radially outwardly, in frustoconical manner, and for best results at an included angle $x$ with respect to axis 59 which is slightly greater than the included angle of flare $y$ of countersink surface 60. Thus, the periphery of the flange preferably contacts the countersink surface substantially annularly and in a positive stopping action at 73 in FIG. 3. The flange is very thin axially, to be received entirely beneath or axially inwardly of the previously mentioned plane of intersection 62 of the countersink surface 60 and outer surface 58 of the carrier part. For best results, the axially outermost extremity 75 of flange 71 is spaced a substantial distance $t$ axially inwardly of plane 62 (desirably at least about .010 of an inch, and for best results between about .010 and .036 of an inch), to assure against contact of the flange with typically flat member 76 (FIG. 3) being tightened downwardly against surface 58 by a screw 77 connected into the insert. As seen in FIG. 2, the leading edge 70 of the locking portion 69 of each key 57 is so located in the FIGS. 1 through 5 form of the invention as to be received axially outwardly of the countersink engaging portion 73 of the flange 71, so that the installation limiting action of the flange will not be affected by engagement of edges 70 of the keys with the countersink surface.

FIG. 5 shows the preferred method of manufacture of the insert 50 of FIGS. 1 through 4 from an elongated piece of externally threaded metal bar stock 77', which extends along and is centered about an axis 78, and whose external threads 52a are shaped the same as, and form, the previously mentioned external threads 52 of the insert. Successive portions of the bar stock 77 are progressively machined to provide internal threads 56 and flange 71, and are successively cut off from the main body of the stock as indicated at 80, to form a series of the individual inserts. The flange 71 of each insert body is initially machined to the axially projecting condition illustrated at 71a in the upper portion of FIG. 5, and illustrated in broken lines in FIG. 3, with this axially extending projection having cylindrical internal and external surfaces 81 and 82 centered about axis 59. External surface 82 is preferably at a diameter which is not substantially greater than that of minor diameter surfaces 63 of threads 52 and 52a and for best results substantially equals the minor diameter of threads 52 and 52a, as seen clearly in FIG. 3. Projection 71a is very thin radially, so that its internal surface 81 is for best results at a diameter greater than the major diameter of internal threads 56, and is optimally at least as great as the diameter of inner surface 66 of each of the key receiving grooves 65, so that projection 71a is interrupted by the groove at 72 through the entire radial thickness of projection 71a. The two grooves 65 may be formed in the threaded stock 77 prior to delivery of the threaded stock to the screw machine or other machine tool which performs the machining operations illustrated in FIG. 5 and discussed above in connection with that figure.

After axially extending tubular projection 71a has been formed on the end of the insert illustrated in the upper portion of FIG. 5, an appropriate flaring tool illustrated at 181 is brought axially into engagement with projection 71a, and acts to deform that projection radially outwardly to the frustoconical ultimate condition of flange 71 as illustrated in FIG. 3 and in broken lines in FIG. 5. The keys 57 may then be driven into their respective grooves, through the interruptions or notches 72 in flange 71, to complete the assembly of the insert.

In using the insert 50 of FIG. 1, body 51 and its keys 57 may be handled as an essentially integral unit prior to and during installation within that carrier part, with the keys held frictionally in their illustrated positions within grooves 65. This unit is screwed into the carrier part to the position of FIG. 2, in which the installing motion is halted positively and at an accurately predeterminable position by engagement of flange 71 with countersink surface 60. The keys 57 are then driven axially to the position of the right hand key in FIG. 2, to lock the insert against unscrewing rotation from the installed position.

In order to enable effective reception of flange 71 within the interior of the countersink region, and axially inwardly of plane 62 of FIG. 2, the flange desirably has a very limited radial and axial extent. The flange should of course project radially outwardly beyond the minor diameter 63 of external threads 52, but preferably does not project radially outwardly beyond the major diameter of those threads, and optimally does not project outwardly as far as that major diameter, as seen clearly in FIG. 3. A most effective arrangement is attained when the radially outermost portion of the flange projects radially outwardly between about one-fourth and three-fourths of the distance from the minor diameter of the external threads to the major diameter of those threads.

Referring next to FIGS. 6 through 8a, I have illustrated at 10 in those figures a threaded insert embodying certain features of the present invention, and including an insert body 11 and a washer 12 carried by the body. The body 11 is formed of a rigid material, such as a suitable steel or other metal, while the washer 12 is formed of a deformable or flexible material, for example a suitable paper or cardboard. A currently preferred material for use in forming the washer is paper or cardboard impregnated with glycerin and having an appropriate thickness, desirably between about .012 and .030 inch, preferably about .030 inch.

The insert body is adapted to be screwed into a passage 13 formed in a carrier part 14 (FIG. 3). This passage may initially be of straight cylindrical configuration, and be centered about an axis 16' (which is coincident with axis 16 of the insert in its installed position). The outer surface 17 of the carrier part may be planar and be disposed transversely of axis 16'. In use, a screw 18 having external threads 19 is screwed into the insert body 11, to thus secure the screw to the carrier part through the medium of the insert. Screw 18 may have an outer head or enlargement 20, which bears axially inwardly against an element 21, to secure that element to the carrier part. Element 21 may typically take the form of a flat plate, disposed transversely of axis 16, and containing an opening 22 through which the threaded shank 23 of the screw projects, so that head 20 may engage the plate about opening 22.

Body 11 of the insert is essentially tubular, and has external threads 24 (FIG. 6) adapted to be screwed into passage 13 of the carrier part. Threads 24 of body 11 may be self tapping and self locking in character, so that they form internal threads 15 in the side wall of passage 13 of the carrier part as body 11 is screwed into that recess, to the FIG. 8 position, and so that the threads 24 will then have a self locking action serving to effectively prevent unscrewing rotation of the body from the carrier part.

Preferably, the self tapping and self locking threads 24 are of the type disclosed and claimed in U.S. Pat. No. 3,200,691, issued Aug. 17, 1965 to Robert Neuschotz, on "Threaded Elements With Self Tapping Peaks and Recesses." In accordance with the teachings of that patent, threads 24 may have outer surfaces 25 which advance alternately radially inwardly and radially outwardly as they advance circularly about the main axis 16 of the body 11, so that these surfaces truncate the various successive turns of threads 24 in a manner forming circularly spaced minimum diameter portions 26 of surfaces 25, and circularly intermediate maximum diameter peaks 27 of the threads (see FIG. 7). At the axially inner end of body 11, threads 24 may be additionally truncated by annular chamfering at 28. Axially between the successive turns of external threads 24, body 11 may have axially extending modified minor diameter surfaces 29. Except as truncated by outer surfaces 25 and 29, threads 24 may be of uniform profile and of unchanging major and minor diameters along their entire helical extent.

When thread 24, shaped as set forth above, is screwed into the initially unthreaded recess 13 in carrier part 14, the smoothly rounded peaks 27 of the threads serve to very effectively roll or form mating internal threads within the recess wall 13, without the formation of burrs or cuttings, so that after complete installation of insert body 11 within the carrier part, the deformed material of the carrier part tends to return very slightly radially inwardly to positions circularly behind the various rounded peaks 27, in a relation forming an effective lock against unscrewing rotation of the insert. The threads of body 11 may be machined to the discussed configuration by commencing with bar stock of the peaked and recessed cross sectional configuration illustrated in FIG. 2, and then threading that stock through the peaks and recesses (and also chamfering the stock at 28) so that the threads take on the external configuration of the stock, as described.

Internally, insert body 11 has a second set of threads 30, shaped in correspondence with and adapted to mate with external threads 19 of screw 18. These internal threads 30 may be annularly chamfered at their opposite ends, as indicated at 31 and 32.

Washer 12 may be formed of flat sheet material, desirably paper or cardboard as previously mentioned, and is preferably initially in the form of a flat annular disc having an external circular edge 33 and an internal circular edge 34, both centered about axis 16. Desirably, the material of washer 12 has some resilience, in order that it may resist compression and tend to return at least partially toward its uncompressed condition when tightened between elements 14 and 21 as seen in FIG. 8, to thus resiliently maintain these elements in relatively cushioned and spaced conditions.

The upper or axially outer extremity of external threads 24 may terminate in a transverse planar surface 35 (FIG. 6), against which the flat or planar undersurface 36 of washer 12 is engageable to limit axially inward movement of the washer relative to the body. Surface 35 may have a narrow circularly continuous radially inner portion (right half of FIG. 6) and may extend further radially outwardly at locations at which this surface intersects a turn of thread 24. Axially outwardly beyond the plane of surface 35, body 11 may have a short external cylindrical surface 37 centered about axis 16, and engageable with internal cylindrical edge surface 34 of the washer to center the washer about axis 16. Upwardly or axially outwardly beyond washer 12, the material of body 11 forms an annular flange 38, which is centered about axis 16, and which retains washer 12 against axially outward movement relative to and from body 11. As best seen in FIG. 6a, this flange 38 is of upwardly flaring or frustoconical configuration, having radially inner and outer surfaces 39 and 40 which may be parallel to one another, and which flare progressively outwardly relative to axis 16. This flange 38 may initially be machined or shaped to the directly axially projecting straight cylindrical shape illustrated in broken lines at 138 in FIG. 6a, to enable application of washer 12 to the insert body, and to enable the flange to be completely annular and unaffected by the initially non-cylindrical outer surface of the bar stock, following which flange 38 may be deformed to its full line position of FIG. 6a. The radially outer surface of axially projecting portion 138 is cylindrical and of a diameter less than the minimum diameter or radius regions 26 of the bar stock as illustrated in FIG. 7. At the location of washer 12 and flange 38, the side wall of body 11 may be of reduced radial thickness, being defined internally by a surface 41 of a diameter which may be substantially greater than the major diameter of internal threads 30, with this surface 41 ultimately curving outwardly and merging annularly with the previously mentioned surface 39 of the flange.

The inner edge surface 34 of washer 12, and the engaged external surface 37 of body 11, are preferably of a diameter slightly less than the minor diameter of external threads 24, as seen clearly in FIG. 6a. Also, the radially outer extremity 42 of flange 38 is preferably of a diameter greater than that minor diameter of external threads 24, and for best results less than the major diameter of threads 24 (at their peaks 27). Extremity 42 is also of a diameter greater than the diameter of cylindrical bore 13 in the carrier part, and greater than the minor diameter of the internal threads 15 which are formed in the carrier part upon installation of the insert within that part.

With reference again to FIG. 8, it is noted that carrier part 14 is provided with an annular countersink surface 43 at the axially outer extremity of recess 13. This countersink surface 43 preferably tapers or flares at an angle 143 with respect to axis 16, which angle for best results corresponds to the angle of flare of surface 39 and 40 of flange 38 of body 11.

In using the insert assembly of FIGS. 6 to 8a, assume that washer 12 is initially in the flat transverse condition of FIG. 6. With the assembly in the condition of FIG. 6, body 11 is screwed into recess 13 of the carrier part, and to the position of FIG. 8, by an appropriate installing tool which acts to advance body 11 along axis 116, and to simultaneously turn the body about that axis until the position of FIG. 8 is reached. As body 11 advances into the carrier part, it taps threads 15 in the wall of recess 13. When washer 12 contacts upper surface 17 of the carrier part, the washer is deformed toward the condition of FIG. 8, in which the radially inner portion of the washer tends to assume a flaring condition corresponding to that of flange 38. Ultimately, the parts reach the FIG. 8 position in which the inner edge portion of the washer is clamped between, and flares frustoconically in correspondence with, flange 38 and countersink surface 43 of the carrier part, with this clamping action effectively limiting the extent to which body 11 may be screwed into the carrier part. In this connection, it is noted that flange 38 projects radially outwardly far enough to contact the upper surface of washer 12 at a location directly axially opposite the location at which the undersurface of that washer is contacted by countersink surface 43 of the carrier part. This is brought out in FIG. 6a, in which the two broken lines 44 and 45 define a portion of the washer which is clamped directly axially between flange 38 and countersink surface 43, as discussed. This clamping action occurs throughout a substantial portion of the circular extent of flange 38, but is of course interrupted at some locations where the thread groove in the carrier part interrupts countersink surface 43.

Flange 38 is preferably of sufficiently limited axial and radial extent to enable it to be received entirely beneath the plane of surface 17 of the carrier part in the fully installed position of the insert. After the insert assembly has reached the FIG. 8 position, screw 18 may be utilized to tighten plate 21 against washer 12, so that the outer portion of the washer is deformed to its transverse FIG. 8 condition, and so that the washer may then serve as an effective spacer for maintaining the plate out of contact with carrier part surface 17, and thereby prevent such squeaking, rattling, or the like as might be caused by direct contact of part 21 with the carrier part.

In the arrangement shown in FIGS. 9 through 13, which incorporate certain features of the invention, I have shown at 10' a conventional honeycomb structure such as is utilized widely in forming aircraft wings, wall structures, components, etc. This structure includes two typically parallel and typically planar sheet metal "skins" 11' and 12', which may for example be formed of aluminum or other suitable material, with a honeycomb core 13' received between the two skins and interconnecting them. The honeycomb core is formed of strips or pieces of thin sheet metal, foil or other sheet material extending between the two skins 11' and 12', and defining a honeycomb cross section. These various pieces of sheet metal forming the core are of course welded or otherwise secured to one another, and to the skins, to integrate the entire structure into a unitary assembly having a high strength to weight ratio.

In the honeycomb structure 10' of FIG. 9, there is mounted a threaded insert 14', which is connected into a body of essentially rigid resinous plastic material 15' carried by the honeycomb structure at a localized area. To allow for reception of the resinous plastic anchoring material 15', the upper skin 11' of the honeycomb material may first be drilled to provide a circular opening in it centered about an axis 17' extending perpendicular to the two skins, following which a routing tool may be inserted downwardly through the opening into the interior of the honeycomb assembly, and be moved about in a manner locally cutting away or routing out some of the core material, to provide an essentially circular or cylindrical space centered about axis 17'. The resinous plastic material 15', typically an epoxy, is filled into the space in uncured form, and is then polymerized to a hardened condition. After polymerization or curing of the anchoring material 15', a passage 19' is drilled in the resinous plastic material, with this passage defining a cylindrical internal wall surface 20' in the plastic material centered about axis 17'. At the upper end of wall surface 20', there is machined an annular upwardly flaring countersink surface 20" in upper skin 11', and a continuation 21' of this countersink surface in the resinous plastic material, with both of the countersink surfaces 20" and 21' being centered about axis 17', and preferably tapering at an included angle of between about 70 and 100 degrees, for best results approximately 90 degrees.

The insert 14' has an essentially tubular body 22' formed of an appropriate rigid metal such as steel, and containing internal threads 23' into which an externally threaded screw or stud may be connected for the purpose of securing that screw or stud to the honeycomb structure 10' through the medium of the insert. Threads 23' may be a standard thread, in order to receive a screw having completely standard external threads.

Externally, the body 22' of insert 14' preferably has a self tapping and self locking outer thread 24', which is desirably of the peaked and recessed type disclosed and claimed in my prior Pat. No. 3,200,691. As in the previously discussed arrangement of FIGS. 6 through 8a, these threads 24' have radially outer surfaces 25' which face radially outwardly and which advance alternately toward and away from axis 17' as they advance circularly about that axis, to give the threads 24' the peripheral shape illustrated in FIG. 11, having alternate peaks 26' formed at the maximum diameter portions of surface 25', and circularly intermediate reduced radius valleys or recesses 27' between the peaks. The peaks are outwardly convex, as shown, with each of the reduced radius areas 27' being recessed radially inwardly beyond a plane such as that illustrated at 28' in FIG. 11 and drawn to just touch two adjacent peaks. At the axially inner or lower end of the insert 14', threads 24' are further truncated by formation of a chamfer surface 29' (FIG. 9) on the insert, centered about and tapering frustoconically with respect to axis 17', to facilitate initial advancement of the thread 24' into the resinous plastic material 15'. At its upper end, the side wall of body 22' of the insert forms an annular radially outwardly flaring flange 30' defined by parallel radially inner and outer annular surfaces 31' and 32' which preferably flare at an angle a (FIG. 9) corresponding essentially to the angle of flare of countersink surfaces 20" and 21'. The radially outermost annular edge 33' of flange 30' projects outwardly beyond the minor diameter surfaces 34' of external threads 24', and preferably projects to a diameter closer to the major or maximum diameter of threads 24' (and peaks 26') than to minor diameter surfaces 34'. In the arrangement of FIG. 9, the diameter of edge 33' is typically equal to, or substantially equal to, the maximum peak diameter of threads 24'. It will also be noted that the minor diameter surfaces 34' of threads 24' are modified in character, that is, do not correspond to the minor diameter of standard threads, but rather extend cylindrically through a greater than standard axial distance $d$ which exceeds the axial extent $t$ of the thread peaks 26', and preferably exceeds the maximum axial thickness $w$ of each turn of the threads 24'.

FIG. 12 illustrates the manner in which a series of the inserts 14' are preferably formed from an elongated piece of metal stock 35' having the peaked and recessed cross section illustrated in FIG. 13. It will be noted that this external cross section of the stock 35' corresponds to the previously discussed peripheral configuration of the outer surface or surfaces 25' of threads 24' in FIG. 11, and in particular has alternate peaks 26" and recesses 27" corresponding to the peaks and recesses 26' and 27' respectively of FIG. 11. Stock 35' is initially of a length corresponding to the combined length of a series of the inserts 14', so that several successive inserts may be formed from the same rod. As indicated at the lower end of the stock 35' in FIG. 12, the threads 24' are formed on the outside of the stock by merely advancing along the outside of the stock, as the latter turns, a conventional thread chaser or thread forming tool 36', so positioned and shaped as to form the minor diameter surfaces 34' and to cut the threads in a manner such that the outer surface of stock 35' forms the waving outer surface 25' of threads 24'. When first machined, the insert 14' may be of the shape illustrated at 14" in the lower portion of FIG. 12, in which the external threads 24' are chamfered at 29' as previously described, and in which internal threads 23' are formed as in FIG. 9, but with the end portion 30" which will ultimately form flange 30' being internally and externally of straight cylindrical configuration, and with the outer surface of this portion 30" desirably being of a diameter corresponding to the minor diameter 34' of threads 24'. After the insert has been formed to the condition illustrated at 14" in FIG. 12, portion 30" of the element is annularly deformed radially outwardly from its straight cylindrical condition to the outwardly flaring condition of FIG. 9, to form the annular flaring flange 30'. Thus, even though the flange 30' may ultimately project radially outwardly to a position as far out as the maximum diameter peaks 26' of threads 24', the flange does not have the peaked and recessed cross sectional configuration of the initial stock 35', but rather is completely annular because of its initial formation in the condition illustrated at 30" in FIG. 12.

The insert 14' is installed within the honeycomb structure 10' of FIG. 9 by merely screwing threads 24' downwardly into passage 19' in the resinous plastic material 15', with the peaks 26' of threads 24' acting to progressively roll or form mating internal threads 37' in the plastic material, and acting in the final installed condition of FIG. 9 to resist or prevent unscrewing rotation of the insert from that FIG. 9 position. The insert is advanced to a position in which it is slightly beneath the upper surface 38' of top skin 11', and in which flange 30' is located within and radially opposite countersink surfaces 20' and 20", and is also axially opposite one or both of these countersink surfaces in a relation enabling the flange if desired to serve as a stop for limiting the installing advancement of the insert in accordance with the teachings of the above discussed first form of the invention. Alternatively, the flange may in some instances be spaced slightly from the countersink surfaces as in the fully installed condition, as indicated in FIG. 9.

A mating screw or stud is attached to the insert by screwing it into internal threads 23', to connect another part to the FIG. 9 assembly. In the event of exertion of excessive forces against the insert through the screw and transversely of axis 17', those forces are taken partially by the resinous plastic material 15', and partially by engagement of surface 32' of flange 30' with countersink surface 20' of skin 11', to thus definitely limit such transverse motion of the insert. Also, the flange 30" gives to the overall assembly of FIG. 9 a neat and pleasing appearance as viewed from the outside of skin 11'.

FIG. 14 is similar to FIG. 8, but does not include all of the features of FIG. 8. Specifically, the FIG. 14 arrangement differs from that of FIG. 8 in that the annular flange 85 on insert body 86 has a maximum diameter which is less than the minor diameter of external threads 87. Flange 85 is initially formed in a directly axially extending condition, having concentric parallel inner and outer cylindrical surfaces, as in FIG. 6a, and is then deformed annularly radially outwardly to the FIG. 14 condition. In that condition, the flange tightly grips the annular inner edge of deformable washer 88, which spaces plate 89 from carrier part 90 when screw 91 is tightened to the FIG. 14 position. External threads 87 may have the same peaked and recessed self tapping and self locking configuration discussed in connection with the FIGS. 6 through 8a and FIGS. 9 through 13 forms of the invention. In the FIG. 14 assembled position, flange 85 is desirably received entirely beneath the plane of upper surface 92 of the carrier part.

FIG. 15 shows still another arrangement, incorporating some but not all of the preferred features of the invention, and which is similar to the FIG. 14 device except that the insert 93 has an enlarged diameter annular portion 94 which is externally cylindrical and received within a cylindrical counter-bore 95 in the carrier part 96, with this enlarged diameter portion 94 containing an annular groove 97 within which the inner edge of annular paper washer 98 is received and tightly gripped. The groove may be formed by providing the insert with an initially axially projecting cylindrical portion 99 which is deformed radially outwardly to clamp the paper washer in place. A countersink surface 100 is formed at the axially outer end of the counter-bore. The external threads 101 on the FIG. 15 device may be of the previously described self tapping and self locking configuration utilized in FIGS. 6 through 8a, and in others of the forms of the invention, but with the threads of FIG. 15 being cast rather than machined, in order to provide the annular enlargement 95.

I claim:

1. The combination comprising a carrier structure containing a recess having an internal thread and having an outer surface extending about the axially outer end of said recess, said structure having a flaring countersink surface at said axially outer end of the thread recessed axially inwardly of said outer surface, and a fastener assembly screwed into said recess and adapted to be locked therein, said fastener assembly including a generally tubular body having an external thread connected into said internal thread of the carrier structure, and having an internal thread for connection to a coacting member to secure said member to the carrier structure through the medium of said fastener assembly, said body having a substantially annular flange which is at the axially outer end of said external thread and is formed independently of said external thread and not as a portion thereof and which bears against said flaring countersink surface in a relation limiting the extent to which said body is screwed into said recess, said flange being received entirely within said recess and having its axially outermost extremity flush with or slightly inwardly of said outer surface of the carrier structure, said body containing a groove extending generally axially along its radially outer surface past the location of said flange and extending through and interrupting at least a portion of said external thread axially inwardly of the flange, and a locking key carried in fixed position within said groove prior to and during connection of the fastener assembly to the carrier structure, said key having a relatively thin mounting portion received in said groove axially inwardly of said flange and having a thicker locking portion projecting axially outwardly beyond said flange and beyond said outer surface of the carrier structure and accessible for driving the key generally axially inwardly within the groove to lock the fastener assembly against removal from the carrier structure, said flange being interrupted at the location of said key, said flange being flared to advance simultaneously both axially outwardly and radially outwardly toward said extremity of the flange and being defined by a first flaring surface at its radially outer side and a generally radially opposite and generally parallel second flaring surface at its radially inner side, said extremity of the flange projecting radially outwardly beyond the minor diameter of said external thread but not as far as the major diameter thereof.

2. The combination comprising a carrier structure containing a recess having an internal thread and having an outer surface extending about the axially outer end of said recess, said structure having a stop surface at said axially outer end of the thread recessed axially inwardly of said outer surface, and a fastener assembly screwed into said recess and adapted to be locked therein, said fastener assembly including a body having an external thread connected into said internal thread of the carrier structure, and having an additional thread for connection to a coating member to secure said member to the carrier structure through the medium of said fastener assembly, said body having a flange which is at the axially outer end of said external thread and is formed independently of said external thread and not as a portion thereof and which bears against said stop surface in a relation limiting the extent to which said body is screwed into said recess, said flange being received entirely within said recess and having its axially outermost extremity flush with or slightly inwardly of said outer surface of the carrier structure, said body containing a groove extending generally axially along its radially outer surface and extending through and interrupting at least a portion of said external thread axially inwardly of the flange, and a locking key carried in fixed position within said groove prior to and during connection of the fastener assembly to the carrier structure, said key having a mounting portion received in said groove axially inwardly of said flange and having a portion projecting axially outwardly beyond said flange and beyond said outer surface of the carrier structure and accessible for driving the key generally axially inwardly within the groove to lock the fastener assembly against removal from the carrier structure, said flange being interrupted at the location of said key, said flange projecting radially outwardly beyond the minor diameter of said external thread but not as far as the major diameter thereof.

3. The combination as recited in claim 2, in which said flange has an outer surface which is flared to advance simultaneously both axially outwardly and radially outwardly toward said extremity of the flange.

4. The combination as recited in claim 2, in which said flange has a first flaring surface at its radially outer side and a second flaring surface at its radially inner side.

5. The combination as recited in claim 2, in which the entire radial wall thickness of said body at the location of said flange is located at least as far radially outwardly as the radially innermost portion of said key.

6. The combination as recited in claim 2, in which the radially outer extremity of said flange projects outwardly between about one-fourth and three-fourths of the distance from the minor diameter of said external thread to its major diameter.

7. A fastener assembly to be screwed into a carrier structure which contains a recess having an internal thread and which has an outer surface extending about the axially outer end of said recess and a stop surface recessed axially inwardly of said outer surface; said fastener assembly including a body having an external thread adapted to be connected into said internal thread of the carrier structure, and having an additional thread for connection to a coacting member to secure said member to the carrier structure through the medium of said fastener assembly, said body having a flange which is at the axially outer end of said external thread and is formed independently of said external thread and not as a portion thereof and which is adapted to bear against said stop surface in a relation limiting the extent to which said body is screwed into said recess, said body containing a groove extending generally axially along its radially outer surface and extending through and interrupting at least a portion of said external thread axially inwardly of the flange, and a locking key carried in fixed position within said groove prior to and during connection of the fastener assembly to the carrier structure, said key having a mounting portion received in said groove axially inwardly of said flange and having a portion projecting axially outwardly beyond said flange and accessible for driving the key generally axially inwardly within the groove to lock the fastener assembly against removal from the carrier structure, said flange being interrupted at the location of said key, said flange projecting radially outwardly beyond the minor diameter of said external thread but not as far as the major diameter thereof.

8. A fastener assembly as recited in claim 7, in which said flange has an outer surface which is flared to advance simultaneously both axially outwardly and radially outwardly toward said extremity of the flange.

9. A fastener assembly as recited in claim 7, in which the entire radial wall thickness of said body at the location of said flange is located at least as far radially outwardly as the radially innermost portion of said key.

10. A fastener assembly as recited in claim 7, in which the radially outer extremity of said flange projects outwardly between about one-fourth and three-fourths of the distance from the minor diameter of said external thread to its major diameter.

11. A fastener assembly to be screwed into a carrier structure which contains a recess having an internal thread and which has an outer surface extending about the axially outer end of said recess and a flaring countersink surface recessed axially inwardly of said outer surface; said fastener assembly including a generally tubular body having an external thread adapted to be connected into said internal thread of the carrier structure, and having an internal thread for connection to a coacting member to secure said member to the carrier structure through the medium of said fastener assembly, said body having a substantially annular flange which is at the axially outer end of said external thread and is formed independently of said external thread and not as a portion thereof and which is adapted to bear against said flaring countersink surface in a relation limiting the extent to which said body is screwed into said recess, said body containing a groove extending generally axially along its radially outer surface and extending through and interruping at least a portion of said external thread axially inwardly of the flange, and a locking key carried in fixed position within said groove prior to and during connection of the fastener assembly to the carrier structure, said key having a relatively thin mounting portion received in said groove axially inwardly of said flange and having a thicker locking portion projecting axially outwardly beyond said flange and accessible for driving the key generally axially inwardly within the groove to lock the fastener assembly against removal from the carrier structure, said flange being interrupted at the location of said key, said extremity of the flange projecting radially outwardly beyond the minor diameter of said external thread but not as far as the major diameter thereof.

12. A fastener comprising a body having an external thread adapted to be screwed into a recess in a carrier structure, and having an additional thread for connection to another member, said body having a flange at an axially outer end of said external thread which is formed independently of said external thread and not as a portion thereof and which extends radially outwardly to a location beyond the minor diameter of said external thread but not as far as the major diameter of said external thread and which has an axially inner surface flared to advance both axially outwardly and radially outwardly and positioned for reception directly axially opposite an axially outwardly facing surface of said carrier structure in a relation limiting threaded advancement of the fastener into said recess.

13. A fastener as recited in claim 12, including a locking key carried by said body and driveable axially relative thereto to lock the body within said carrier structure.

14. A fastener assembly to be screwed into a carrier structure which contains a recess having an internal thread and which has an outer surface extending about the axially outer end of said recess and a stop surface recessed axially inwardly of said outer surface; said fastener assembly including a body having an external thread adapted to be connected into said internal thread of the carrier structure, and having an additional thread for connection to a coacting member to secure said member to the carrier structure through the medium of said fastener assembly, said body having a flange which is at the axially outer end of said external thread and is formed independently of said external thread and not as a portion thereof and which is adapted to bear against said stop surface in a relation limiting the extent to which said body is screwed into said recess, said body containing a groove extending generally axially along its radially outer surface and extending through and interrupting at least a portion of said external thread axially inwardly of the flange, and a locking key carried in fixed position within said groove prior to and during connection of the fastener assembly to the carrier structure, said key having a mounting portion received in said groove axially inwardly of said flange and having a portion projecting axially outwardly beyond said flange and accessible for driving the key generally axially inwardly within the groove to lock the fastener assembly against removal from the carrier structure, said flange being interrupted at the location of said key, the entire radial wall thickness of said body at the location of said flange being located at least as far radially outwardly as the radially innermost portion of said kay.

References Cited

UNITED STATES PATENTS

| | | | |
|---|---|---|---|
| 824,017 | 6/1906 | Herdle | 151—68 |
| 964,850 | 7/1910 | Burrows | 151—23 |
| 1,982,488 | 11/1934 | Weber | 151—41.73 |
| 2,002,741 | 5/1935 | Hunt | 151—41.73 |
| 2,367,399 | 1/1945 | Isakson | 151—23 |
| 2,466,546 | 4/1949 | Huelster | 151—41.73 |
| 2,783,811 | 3/1957 | Cummaro | 151—8 |
| 2,855,970 | 10/1958 | Neuschotz | 151—23 |
| 3,212,796 | 10/1965 | Neuschotz | 151—41.73 |
| 2,565,852 | 8/1951 | Ickes et al. | 85—9 |
| 2,967,593 | 1/1961 | Cushman | 151—41.7 |
| 3,435,870 | 4/1969 | Neuschotz | 151—23 |

MARION PARSONS, Jr., Primary Examiner

U.S. Cl. X.R.

151—41.73; 85—9